United States Patent [19]

Lindberg et al.

[11] Patent Number: 5,020,855
[45] Date of Patent: Jun. 4, 1991

[54] ADJUSTABLE HEADREST

[75] Inventors: Kenneth M. Lindberg; David J. Spykerman; Philip C. George; Wesley D. Mersman, all of Holland, Mich.

[73] Assignee: Prince Corporation, Holland, Mich.

[21] Appl. No.: 477,411

[22] Filed: Feb. 9, 1990

[51] Int. Cl.⁵ .............................................. A47C 7/36
[52] U.S. Cl. .................................. 297/391; 297/409; 297/284
[58] Field of Search ............... 297/391, 409, 284; 248/118, 421; 403/297; 411/535, 536; 108/146; 74/530

[56]  References Cited
U.S. PATENT DOCUMENTS

| | | | |
|---|---|---|---|
| 4,313,637 | 2/1982 | Barley | 297/284 |
| 4,600,240 | 7/1986 | Suman et al. | 297/408 |
| 4,637,655 | 1/1987 | Fourrey et al. | 297/410 |
| 4,640,549 | 2/1987 | Yokota | 297/410 |
| 4,657,304 | 4/1987 | Heesch et al. | 297/391 |
| 4,733,913 | 3/1988 | Tateyama | 297/409 |
| 4,762,367 | 8/1988 | Denton | 297/409 |
| 4,778,218 | 10/1988 | Suman | 297/391 |

Primary Examiner—Kenneth J. Dorner
Assistant Examiner—J. Bonifanti
Attorney, Agent, or Firm—Price Heneveld Cooper DeWitt & Litton

[57]  ABSTRACT

An adjustable headrest includes a rotatable member positioned between a stationary member and a movable member to which a padded head support is attached. The member has opposed staggered arcuate surfaces extending on opposite sides of a pivot point with one of the surfaces including teeth which selectively engage teeth on the movable member, while the remaining arcuate surface of the member engages a stationary portion of the headrest. A spring holds the teeth in removable engagement with each other and an articulated release arm selectively disengage the teeth to retract the head support.

20 Claims, 2 Drawing Sheets

ADJUSTABLE HEADREST

BACKGROUND OF THE INVENTION

The present invention pertains to a vehicle headrest, and particularly to one which is adjustable.

There exists a variety of proposed headrest constructions which allow a headrest to be adjusted to fit a particular driver or passenger. One adjustable headrest provides a pivoting adjustment as disclosed in U.S. Pat. No. 4,600,240 while a pneumatically operated bellows-type control is provided for another adjustable headrest as disclosed in U.S. Pat. No. 4,778,218. These headrests as well as others which include screw jack-type adjustments with scissor arms for supporting a movable plate with respect to a stationary plate typically are mounted to rods which extend into the seat back and provide vertical adjustment of the headrests.

Although these systems provide the desired adjustment motion, some are either somewhat complicated to manufacture or require auxiliary equipment to operate and/or are relatively slow and cumbersome to use.

SUMMARY OF THE PRESENT INVENTION

The adjustable headrest of the present invention provides a relatively uncomplicated reliable adjustment system in which a rotatable member is positioned between a stationary member and a movable member to which a padded head support is attached. The stationary member is attached to the vehicle seat. The headrest is movably adjustable to a selected extended position and is self-locking into the adjusted position. It can easily be released to return to a fully retracted position for subsequent movement to other desired extended positions.

In a preferred embodiment of the present invention, the pivoted adjustment member provide opposed staggered arcuate surfaces extending on opposite sides of a pivot point with one of the surfaces including teeth means which selectively engage teeth means on a movable member, while the remaining arcuate surface of the adjustment member engages a stationary portion of the headrest. Bias means hold the teeth in engagement. As the movable headrest is manually extended, the teeth means on the pivoted member tend to disengage the teeth means on the movable member to allow its extension to a desired position whereupon releasing the headrest allows the teeth to re-engage and lock the headrest in a fixed selectively adjusted position. To allow the headrest to fully retract, a release lever selectively disengages the teeth means for allowing the bias means to return the headrest to a retracted position.

The resultant structure provides a relatively inexpensive, reliable, manually adjustable headrest which can be extended to any desired position and locked in place. It subsequently can be easily returned to a desired retracted position. These and other features, objects and advantages of the present invention, will become apparent upon reading the following description thereof together with reference to the accompanying drawings in which:

DETAILED DESCRIPTION OF THE PREFERRED EMBODIMENT

Figure 1:
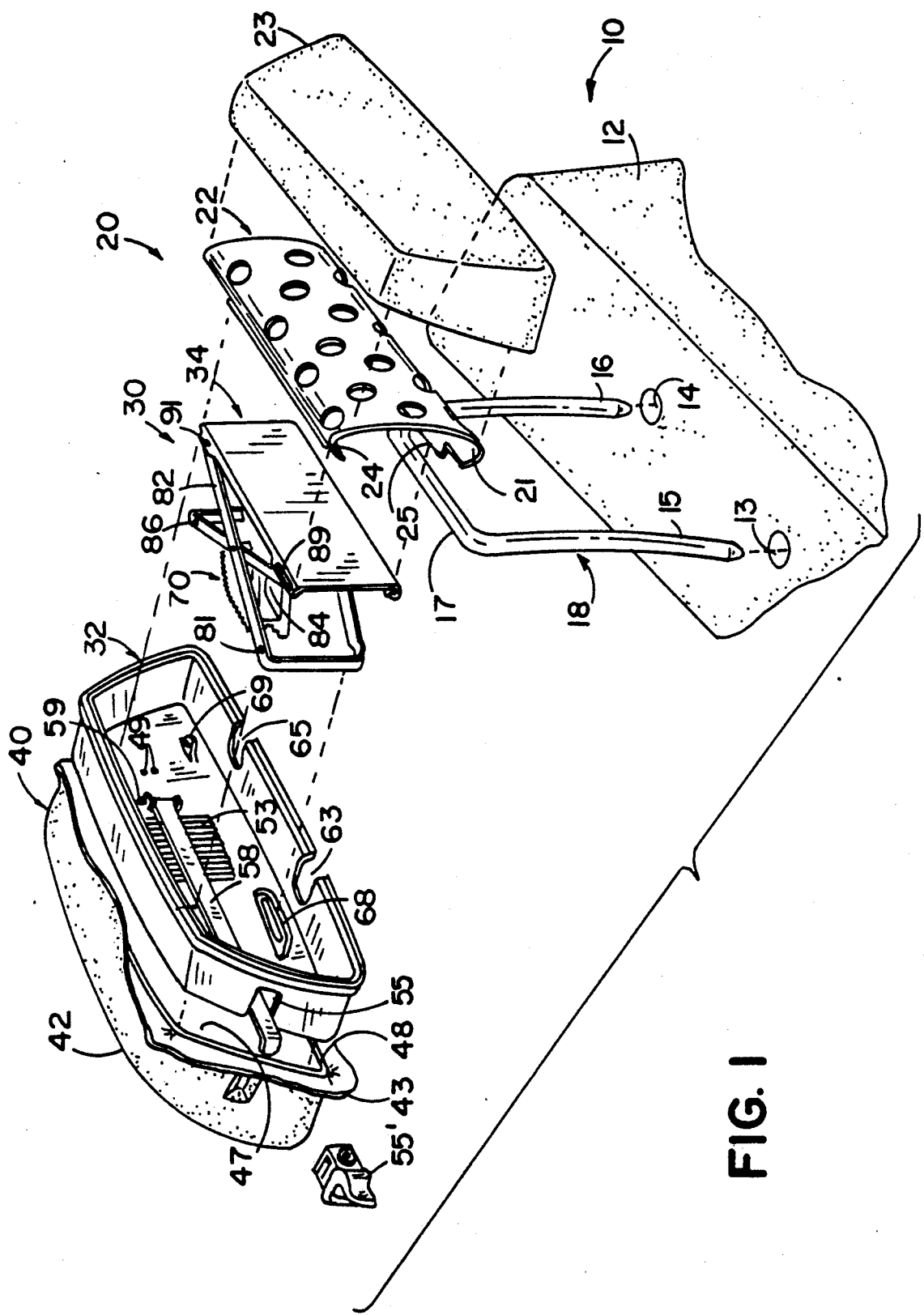
FIG. 1 is a fragmentary perspective exploded view of a headrest embodying the present invention.

Referring initially to FIG. 1 there is shown a seat 10 of a vehicle such as an automobile, which includes an adjustable headrest assembly 20 embodying the present invention. The back 12 of the seat includes a pair of apertures 13 and 14 for receiving a pair of downwardly extending spaced posts 15 and 16 of a U-shaped mounting member 18 having a cross arm 17 for mounting the headrest assembly 20 to the seat back 12. Members 15 and 16 are conventionally adjustably supported within apertures 13 and 14 by suitable frictional engagement means such as by collars mounted within the apertures or the like, which structure is not shown.

The headrest assembly 20 includes an expanded metal support member 22 which is mounted to cross member 17 by suitable fastening means. Member 22 includes a curvilinear cradle section 21 which fits under and partially circumscribes cross member 17 and is further secured by fastening means (not shown) such as screws or the like which can allow member 22 to tilt with respect to cross member 17 for tilting the headrest assembly 20 about the longitudinal axis of section 17 if desired.

A decorative cover 23 fits over the rear of member 22 and faces rearwardly in the vehicle for providing a decorative appearance to the rear surface of the headrest assembly. Mounted to the forward facing portion of member 22 is an adjustable headrest control 30 embodying the present invention and including a stationary member 34 and movable member 32 movably intercoupled as shown and described in greater detail below in connection with FIGS. 2 and 3. The stationary member 34 is coupled to fixed plate 22 while a padded head support assembly 40 is secured to movable member 32.

Member 40 includes an outer covering 42 made of a suitable upholstery material which includes expanded foam padding which extends over a concave headrest form 44 with an integral peripheral wall 48 extending rearwardly from a vertical wall 47. The end flaps 43 of the upholstery material are held in place over form 44 and member 32 by a snap-in trim ring (not shown). Member 40 includes a pair of notches in the lower wall section which align with notches 63 and 65 in member 32 and are spaced to allow clearance of the member with respect to legs 15 and 16. Wall 48 is spaced from a control member 30 to allow the free movement of padded head support 40 with respect to the fixed structure of the headrest assembly 20 including members 30, 18, 23. Thus member 40 is generally concave including side walls 48 which completely enclose headrest control 30 and extend rearwardly such that for all adjusted positions of the head support 40, the control 30 and its support member 22 are enclosed to provide a neat and decorative appearance to the headrest.

The headrest control 30 movably couples members 40 and 22. Member 34 of control 30 is secured to member 22 by snap fitting between the upper concave portion 24 of member 22 and an outwardly extending ledge 25 through which a plurality of fastening screws extend into a lower portion of member 34. Member 32 is secured to member 40 by means of the trim ring but could also use fastening screws or other suitable conventional fastening means.

Figure 2:
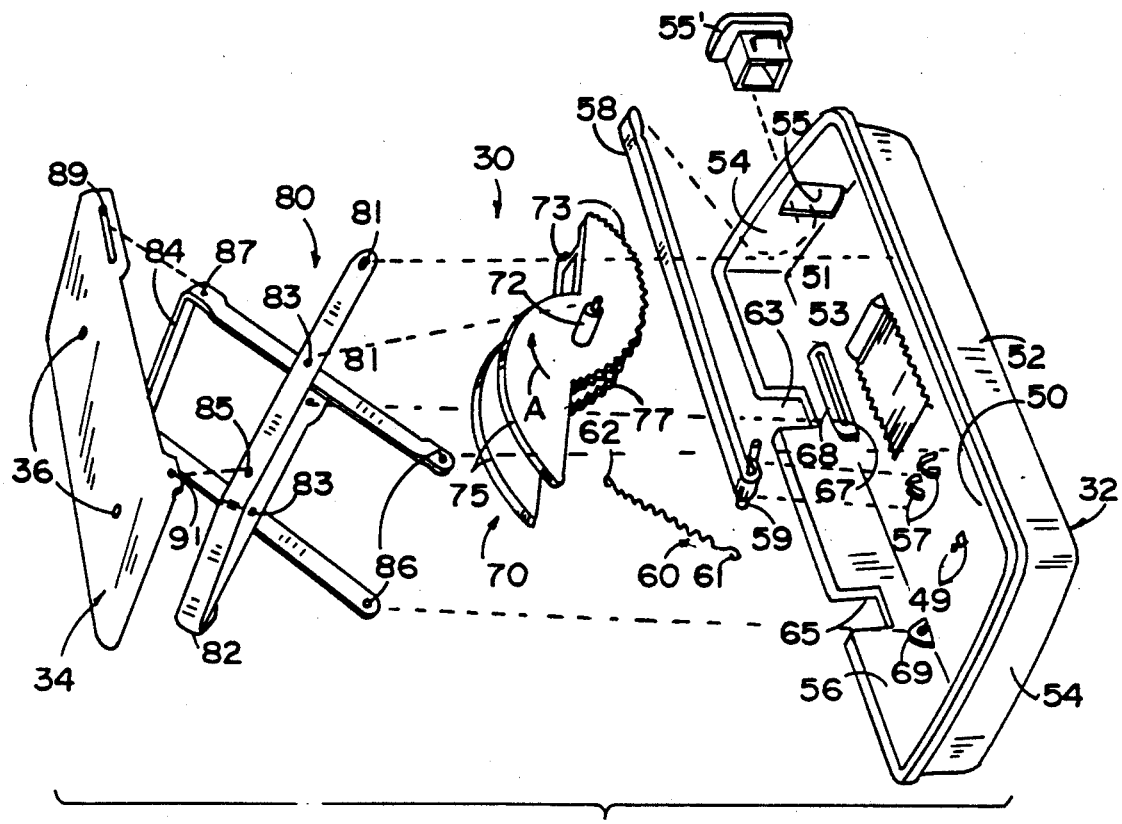
FIG. 2 is an enlarged exploded perspective view of a portion of the structure shown in FIG. 1.
Figure 3:
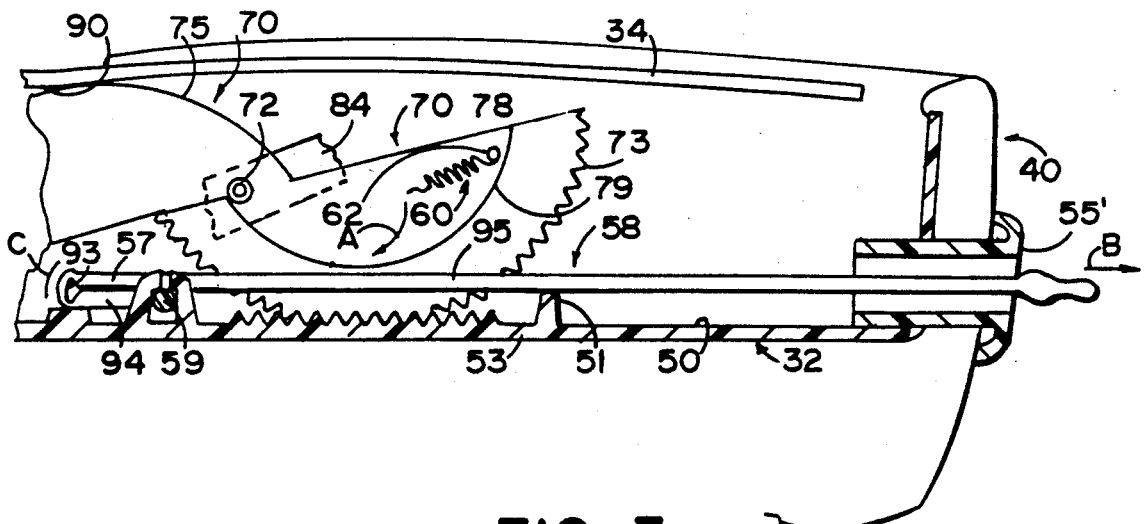
FIG. 3 is an enlarged fragmentary vertical cross-section of the assembled portion of the structure shown in FIG. 1 and shown in FIG. 2.

The headrest control 30 is now described in greater detail in connection with FIGS. 2 and 3, in which the movable support 32 is shown as comprising a generally concave rectilinear shell made of a suitable polymeric material, having an interior generally vertically extending wall 50 with an integral upper wall 52, side walls 54 and floor 56. One of the side walls includes an aperture 55 therethrough for allowing a release arm 58 to extend through the side wall for releasing the headrest from an extended position. Aperture 55 is trimmed by a snap-in trim bezzle member 55' as seen in FIGS. 2 and 3.

The movable member 32 also includes a plurality of integral teeth 53 extending forwardly from the center area of vertically extending wall 50. A shoulder 51 is formed adjacent one edge of the teeth as seen in FIGS. 2 and 3. On a side of the teeth 53 opposite shoulder 51 there is formed a snap-in pivot mount bracket 57 including a pair of shoulders having a notch formed therein for snap receiving the pivot pin 59 of release arm 58 as best seen in FIG. 3. Floor 50 also includes a pair of apertures 49 formed therein for receiving one end 61 of bias spring 60 for securing the end of the spring to the floor. Member 32 also includes a pair of notches 63 and 65 for providing clearance for posts 15 and 16 when the headrest is assembled.

The control member 30 includes a vertically pivoted member 70 which is pivotally mounted between walls 52 and 56 of member 32 by means of a vertically extending pivot axle 72 which fits within apertures 83 of cross members 82 and 84 to pivotally couple member 70 to cross arm assembly 80 which in turn is coupled to members 32 and 34 as described below. This mounting positions the teeth 73 of member 70 in alignment with the teeth 53 on member 32.

Member 70 includes a pair of alternately staggered opposed and bifurcated arcuate surfaces with one pair of the bifurcated surfaces having a plurality of outwardly extending teeth 73. The opposite staggered opposed surfaces 75 on the side of pivot axle 72 opposite surfaces 73 are relatively smooth for engaging the inner flat surface of stationary member 34. Member 70 includes a notch 77 which bifurcates tooth surface 73 into two separate surfaces to allow clearance for the rectangular release arm 58 to extend upwardly between the two spaced toothed curved surfaces 73 and engage smoothly curved surface 79 therebetween when assembled as best seen in FIG. 3. Member 70 is made of a lubricious polymeric material such as a polyvinylchloride (PVC) or other suitable material and the curvature of surface 75 and the locus of the teeth are semicircular with pivot pin 72 offset and between the centers of the arcuate curves of the member.

Spring 60 which has end 61 anchored within apertures 49 in wall 50 has an end 62 which is coupled to member 70 by means of a mounting tab 78 (FIG. 3) and tends to pivot cam member 70 in a direction indicated by Arrow A in FIGS. 2 and 3 and urge head support 40 toward member 34 as described in greater detail below in connection with FIG. 3.

In order to mount the cam and stabilize the motion of movable member 32 with respect to stationary member 34, a cross arm assembly 80 is employed and includes a pair of U-shaped legs 82 and 84 which are pivotally coupled to one another near their midpoint by pivot axle 72. The ends 81 of leg 82 are pivotally mounted to elongated slots 67 in mounting bosses 68 (one shown) extending from wall 50 of member 32 and between walls 52 and 56. Ends 86 of member 84 are also pivotally mounted to an aperture in bosses 69 (one shown) between walls 52 and 54. The opposite ends 87 of leg 84 are pivotally and slidably mounted within slots 89 formed in sides of member 34 while ends 85 of member 82 are pivotally mounted to circular apertures 91 in member 34. With such construction, ends 81 of member 82 and ends 87 of member 84 can pivot and slide as the movable member 32 extends and retracts with respect to fixed member 34. The pivoted anchoring of ends 85 and 86 provide stability for the movement of the member 32 with respect to fixed member 34.

As seen in FIG. 3, spring 60 tends to urge the toothed portion 73 of the member 70 into engagement with teeth 53 in wall 50 of support member 32. At the same time, due to the interconnection of member 70 with cross arm assembly 80 attached to member 34, it tends to urge the headrest toward a retracted position adjacent surface 75 of the member. When it is desired to adjust the headrest, the user manually grasps the head support portion 40 and pulls forwardly. This tends to move the pivot axle 72 away from floor 50 opening up the cross arms 82 and 84 and allowing the interengaging teeth to disengage and slip with respect to one another since the manual force overcomes the spring bias force of tension spring 60. As soon as the outwardly pulling force is removed a the headrest reaches its desired position, spring 60 urges teeth 73 into engagement with teeth 53 locking member 70 in the adjusted rotated position which corresponds to the spacing between surfaces 90 and 50 as occupied by the opposed arcuate surfaces 75 and 73 of member 70.

When it is desired to retract the head supporting portion 40 of the headrest, control arm 58 is pulled outwardly as indicated by Arrow B in FIG. 3. This tends to lift the articulated pivoted end of the control arm upwardly as indicated by Arrow C raising the teeth 73 of the member 70 out of engagement with teeth 53, thereby allowing the spring 60 to retract cross arms 82 and 84 and movable member 32 coupled thereto toward stationary member 34. To provide sufficient lifting of arm 58, it includes a resilient hinge 93 between a short folded-back leg 94 joining hinge 93 to pivot pin 59. As arm 58 is pulled, leg 94 rotates such that surface 95 of arm 58 lifts the member 70 off of the teeth 53 for all positions of the headrest.

Thus by virtue of the use of a unique pivoted adjustment member, together with the release mechanism, a relatively inexpensive and reliable headrest adjustment is provided for providing fore and aft adjustment of the headrest to suit a particular user's adjustment needs. It will become apparent to those skilled in the art that various modifications to the preferred embodiment described herein can be made without departing from the spirit or scope of the invention as defined by the appended claims.

The embodiments of the invention in which an exclusive property or privilege is claimed are defined as follows:

1. An adjustable headrest comprising:
   a stationary member and means for mounting said member to an upper portion of a seat back;
   a movable member including head support cross arm means and means extending between said movable member and said stationary member for guideably supporting said movable member in its movement with respect to said stationary member; and
   a pivoted adjustment member extending between said stationary member and said movable member and pivoted for holding said movable member in selected spaced relationship from said stationary member for adjustment of said movable member, wherein said adjustment member is pivotally coupled between said cross arm means.

2. The headrest as defined in claim 1 wherein said adjustment member comprises a pair of arcuate surfaces with one of said surfaces located on one side of the pivot point of said adjustment member and engaging a rear facing surface of said movable member and the other surface located on the other side of said pivot point and engaging a forward facing surface of said stationary member.

3. The headrest as defined in claim 2 wherein said other surface includes teeth and said movable member includes teeth which selectively interengage with said teeth of said adjustment member.

4. The headrest as defined in claim 3 and further including bias means coupled to said adjustment member and to said movable member for urging said teeth of said adjustment member into continuous engagement with said teeth of said movable member.

5. The headrest as defined in claim 4 and further including means coupled to said movable member for selectively urging said teeth of said adjustment member into disengagement with said teeth of said movable member such that said spring urges said movable member towards said movable member.

6. The headrest as defined in claim 5 wherein each of said arcuate surfaces is divided into a pair of spaced surfaces separated by a channel.

7. A vehicle headrest comprising:
 a stationary member adapted to be mounted to a vehicle seat;
 a movable member defining a head support, said movable member movably mounted to said stationary member; and
 an adjustment member body having a pair of alternately staggered arcuate surfaces, said body including means for pivotally mounting said body between said stationary and said movable members, and means for locking said body in a predetermined rotated position.

8. The apparatus as defined in claim 7 wherein at least one of said arcuate surfaces is bifurcated.

9. The apparatus as defined in claim 8 wherein said means for locking said body in a predetermined position includes teeth formed in said at least one arcuate surface for lockably engaging teeth formed on a mating surface of one of said headrest members.

10. The apparatus as defined in claim 9 wherein said means for pivotally mounting said body includes a pivot pin and a floating member for pivotally receiving said pivot pin to allow said teeth to engage and disengage.

11. The apparatus as defined in claim 10 and further including bias means urging said teeth into engagement.

12. The apparatus as defined in claim 11 and further including a release member coupled to said body for urging said teeth into disengagement.

13. An adjustable headrest comprising:
 a stationary member and means for mounting said member to an upper portion of a seat back;
 a movable member including head support means and means extending between said movable member and said stationary member for guideably supporting said movable member in its movement with respect to said stationary member; and
 a pivoted adjustment member extending between said stationary member and said movable member and pivoted for holding said movable member in selected spaced relationship from said stationary member for adjustment of said movable member, wherein said adjustment member includes a body having a pair of alternately staggered arcuate surfaces, said body including means for pivotally mounting said body between said stationary and movable members.

14. The headrest as defined in claim 13 and further including means for locking said adjustment member in a predetermined rotated position.

15. The headrest as defined in claim 14 wherein said means extending between said movable member and said stationary member comprises cross arm means.

16. The headrest as defined in claim 15 wherein said adjustment member is pivotally coupled between said cross arms.

17. The headrest as defined in claim 16 wherein said means for locking said adjustment member in a predetermined position includes teeth formed in said at least one arcuate surface for lockably engaging teeth formed on a mating surface of one of said headrest members.

18. The headrest as defined in claim 17 wherein at least one of said arcuate surfaces is bifurcated.

19. The headrest as defined in claim 18 and further including a release arm pivotally coupled to said movable member and extending in a channel defined by said bifurcated surfaces.

20. The headrest as defined in claim 19 wherein said release arm includes a hinged articulated end lifting said arm toward said cam when said arm is pulled to retract said movable member.

* * * * *